United States Patent [19]

Antczak

[11] 4,439,386

[45] Mar. 27, 1984

[54] VACUUM INJECTION MOLDING PROCESS

[76] Inventor: Thaddeus Antczak, 32431 Halmich, Warren, Mich. 48092

[21] Appl. No.: 199,689

[22] Filed: Oct. 22, 1980

[51] Int. Cl.$^3$ .............................................. B29F 1/00
[52] U.S. Cl. ................................ 264/102; 264/328.6; 264/328.18; 264/328.19; 425/543; 425/546
[58] Field of Search ................ 264/102, 328.6, 328.18, 264/328.19; 425/543, 546

[56] References Cited

U.S. PATENT DOCUMENTS

| | | | |
|---|---|---|---|
| 2,474,721 | 6/1949 | Billner | 25/118 |
| 2,533,986 | 12/1950 | Atterbury | 25/1 |
| 3,428,289 | 2/1969 | Heckrotte et al. | 249/105 |
| 3,975,479 | 8/1976 | McClean | 264/102 |
| 4,131,604 | 12/1978 | Szycher | 264/328.6 X |
| 4,165,358 | 8/1979 | Johnson | 264/102 X |
| 4,256,444 | 3/1981 | Suter | 264/102 X |

FOREIGN PATENT DOCUMENTS 2419961 11/1975 Fed. Rep. of Germany.
2636902  3/1977 Fed. Rep. of Germany.

Primary Examiner—Thomas P. Pavelko
Attorney, Agent, or Firm—Gifford, Van Ophem, Sheridan, Sprinkle & Nabozny

[57] ABSTRACT

Vacuum injection molding designed for manufacturing solid plastics. Elimination of gases from the liquid resins gives polymers which are more dimensionally stable, mechanically stronger, and more resistant to thermooxidative action. Among liquid resin systems like allylics, epoxies, polyesters and so on, the polyurethanes belong to systems which are sensitive not only to reactive gases but also to the moisture absorbed. In the vacuum injection molding, a vacuum system is connected to reactant chambers, metering devices, mixing chambers, and molds. To produce solid polyurethane bodies, polyol and a polyisocyanate or similar reactants are provided in each of the reaction chambers and are flowed through metering devices into a mixing chamber by gravity flow or by pressure differential. The system is designed such that the reactants are kept from moisture and air to avoid formation of bubbles and microbubbles in the polymer bodies produced by the mixture of the reactants. After combining in the mixing chamber, the reaction mixture is flowed into molds by gravity or injected into them by vacuum differential so as to form appropriately shaped bodies of solid polyurethane or the like for applications where other structural materials were heretofore used. Extreme care in avoiding moisture and air to the reactants and the reaction mixture minimizes bubble formation to such a degree that polyurethane bodies of greatly enhanced physical characteristics are produced.

18 Claims, 1 Drawing Figure

VACUUM INJECTION MOLDING PROCESS

BACKGROUND OF THE INVENTION

I. Field of the Invention

The process and apparatus of this invention, and the bodies produced thereby relate generally to the field of molded plastic or resin bodies for commercial and industrial uses where heretofore other structural materials like wood or metals were used. The invention also relates to the use of reduced pressure systems to form polyurethane bodies and other solid polymer bodies.

II. Description of the Prior Art

It is known to form molded plastic bodies by means of equipment which pours or presses the liquid resin into a mold so as to form, for example, a solid polyurethane body. The bodies produced by such a procedure contain some entrapped air bubbles or gas bubbles as the result of the reaction of entrapped moisture with the reactants, however, and have disadvantageous physical characteristics for some applications. The requirements of structural engineering plastics are such that no air or bubbles, even in the form of microbubbles, should be found in the solid body.

In my U.S. Pat. No. 4,016,130 entitled "Production of Solid, Rigid Filled Polyurethane Composites," I have devised a method for the formation of filled polyurethane bodies, which method uses a vacuum system in some of the steps. However, a vacuum was not applied to the mixture of ingredients during the mixing procedure in the method of that patent. The importance of avoiding bubbles of any type even at a molecular level, is becoming more apparent for producing polymer bodies of enhanced physical characteristics which heretofore were only available in other materials.

Other attempts to form resin bodies with enhanced characteristics are also known in the art. For example, Suter in the German Offenlegungsschrift No. 2,636,902 shows an injection molding system which uses a vacuum for degasifying, temporarily, the reactants prior to injecting them into a mold. However, that apparatus and method has shortcomings in the injection and transfer of the reactants where bubbles of both microscopic and macroscopic size are induced into the system thereby weakening the resultant bodies. Especially disadvantageous in that procedure is the use of screw pumps to feed the mixtures along lines to the molds. Suter is primarily directed toward the use of epoxy resins for electrical insulators.

Wikolin in Offenlegungsschrift No. 2,419,961 discloses a method for cyclically pressure injecting polyurethane into molds. Wikolin uses a vacuum after the reactants have been poured into the mold so as to assure the proper amount of reactants within a given batch of flowable plastic by preventing further flow of reactants into the mixing chamber. Notably, Wikolin does not apply a vacuum to the reactants prior to injection into the mold and this necessarily allows a significant portion of moisture and air to enter the mold and thereby detract from the physical characteristics of the bodies eventually produced.

Industrial and commercial applications demand that improved physical, mechanical, and other characteristics be obtained for solid, rigid polyurethane bodies and the like, both filled and unfilled, in order to use such bodies to replace what has heretofore been constructed from other structural materials. In order to achieve these characteristics, moisture and air must be eliminated as completely as possible from the reactants and mixture in order to achieve enhanced characteristics for the bodies subsequently formed in the molds.

Solid elastomer polyurethane bodies are normally somewhat translucent or milky as compared to a good transparent glass. This translucent characteristic of elastomers is attributable to, among other things, "voids" in the structure. Each bubble (void) whether microscopic or larger causes a mechanical weakness in the polyurethane body. It is necessary to eliminate all entrapped gases and moisture in order to prevent formation of such voids and form stronger molded pieces.

SUMMARY OF THE INVENTION

A vacuum system is applied to reactant vessels, metering containers, and a mixing chamber so as to minimize the exposure of air and moisture to the reactants and mixture prior to injection molding in the molds where the polyurethane bodies or the like are to be formed according to the invention. Furthermore, even the molds themselves are within a vacuum so as to assure that no moisture interrupts the proper formation of the polymer or resin bodies prior to hardening of the bodies once they are injection molded. The vacuum system is applied not only to degasify and dehumidify the reactants and mixture, but also to transport the materials from one vessel to the next. This is accomplished by equalized vacuum pressure or, if a higher flow speed is needed, by allowing a very small portion of dry gas into the vessel containing the ingredient to be moved. Use of the vacuum gives very efficient removal of bubbles and moisture from the reactants and the mixture. Elimination of bubbles and moisture is extremely important for solid bodies, particularly rigid polyurethanes. Elimination of moisture and bubbles on a microscopic scale is important for increasing the structural strength and other physical properties of the bodies.

It is, therefore, an object of the present invention to inexpensively carry out a process for the production of solid bodies which process eliminates voids from the bodies formed.

It is also an object of this invention to carry out such a process under vacuum, using the vacuum not only to degasify and dehumidify the reactants and the mixture, but also to transport the reactants and mixture within the system by means of the vacuum system or gravity flow without introducing humidity into the system.

It is, therefore, also an object of the present invention to produce solid bodies with strengthened physical, mechanical, and other characteristics for various industrial and commercial uses, which uses include replacement of pieces formerly made from other structural materials such as, for example, wood, metal, or alloys.

It is an object of the present invention to provide for stirring of the mixture of reactants while the reactant mixture is still under vacuum.

It is also an object of the present invention to be able to salvage parts of the equipment used in the process such that it may be reused in subsequent processes.

It is also an object of the present invention to eliminate bubbles and moisture, even on a microscopic and molecular scale to thereby provide better chemical bonding of the polymer chains in the polymeric bodies, thereby enhancing the physical characteristics thereof.

It is also an object of the present invention to provide an apparatus for carrying out the process of this invention.

It is a still further object of the present invention to provide both continuous and batch processes and apparatus for carrying out the invention.

In the following chemical reaction, R represents any organic or substituted organic compound suitable for use in forming a polyurethane resin, for example:

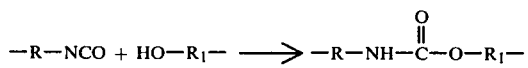

$$-R-NCO + HO-R_1- \longrightarrow -R-NH-\overset{\overset{O}{\|}}{C}-O-R_1-$$

The above reaction represents the formation of polyurethane from a polyisocyanate and a polyol, $R_1$ representing another suitable substituent. The reaction under optimum conditions creates a polyurethane resin of the type desired for the uses described above. Note, however, how the availability of water in any appreciable amount can affect a significant portion of polyisocynate molecules to interfere with the proper formation of a resin body, as shown in the following formula:

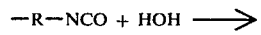

$$-R-NCO + HOH \longrightarrow$$

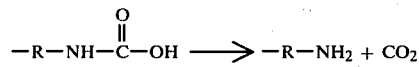

$$-R-NH-\overset{\overset{O}{\|}}{C}-OH \longrightarrow -R-NH_2 + CO_2$$

As can be seen, the availability of water molecules tends to defeat the desired polymerization, form carbon dioxide gas, and disrupt formation of proper polymer chains.

For example, with only the small amount of moisture available at ambient temperature and pressure, the tensile strength of a resultant resin body can be reduced from approximately 10,000 pounds per square inch (70 megapascal-70 MPa), for instance, to 7,000 pounds per square inch (49 MPa). Abrasion resistance and other physical/mechanical characteristics are also affected. Therefore, one can appreciate the necessity of eliminating moisture completely from the formation process in order to obtain the strengthened resin bodies.

The above-mentioned problem, as well as analogous problems with other gases, is in addition to the normal problems encountered with air bubbles in the formation of such resin bodies. Bubbles can occur from mixing the reactants at ambient pressure or when flowing the reactants or mixture from a mixing chamber to the mold. In addition, if the molds are of irregular shapes such that an air bubble may be entrapped, they thereby form a defect on the surface of the resulting resin body. Therefore, it can be appreciated that not only must all moisture be eliminated but, to an economically feasible extent, all air must be eliminated as well in order to achieve strengthened resin bodies such as polyurethanes, etc. These considerations become extremely important in structural engineering plastics which must be completely free of microbubbles in order to be reliable.

From the above considerations, it can be seen that it is an object of the present invention to produce improved strength polyurethane resin bodies and the like by subjecting the entire procedure of forming the polyurethane or other resin to vacuum treatment. In this way, degasification and dehumidification achieved in the reactants is not lost by mixing the reactants at ambient pressure. Mixing at ambient pressure was used in my earlier U.S. Pat. No. 4,016,130.

The step of degasing and dehumidifying the resultant mixture can be significantly shortened if the entire procedure is carried out under vacuum such that the gas and water do not have to be taken out a second time. Furthermore, keeping the molds themselves within the vacuum system eliminates air cushions on the surfaces of the molds, which air cushions or bubbles would destroy the proper shaping and effectiveness of the bodies.

Elimination of moisture and voids in vacuum molding is also important in bonding polyurethanes, for example, to other substances. A major problem in achieving a strong bond between plastics and fiberglass is, among other problems, the formation of a layer of voids due to the moisture absorbed on the fiberglass (as well as grease and impurities) between the two substances. For example, when a composite structure of plastic on fiberglass is impacted, the sheet or body of fiberglass tends to easily separate from the molded plastic layer.

This problem is related to the interface between the polyurethane and filler of my U.S. Pat. No. 4,016,130.

Flowing the liquid resin onto a body already in the mold under vacuum helps to minimize or eliminate the above problem. According to the invention, articles are placed in the mold chamber, the chamber is evacuated, and thereafter a layer is coated on the article or a portion of mixture is bonded thereto.

Therefore, according to the invention, the entire procedure of preparing the reactants, transporting the reactants to a mixing chamber, mixing the reactants, flowing the mixture into the molds, and curing the reactant mixture is carried out under a vacuum. Furthermore, in order to accomplish this end in a most economical maner, it is advisable to carry out the entire operation under one vacuum system. In this manner, once the reactant, polyisocyanate for example, has been degassed and dehumidified, it can be flowed by gravity while applying equalized vacuum in the container for the polyisocyanate and the container to which the polyisocyanate is to be flowed. This is accomplished by manipulating the appropriate stopcocks. If a higher flow speed is needed, a differential vacuum may be applied between the containers. To get that differential vacuum pressure over the polyisocyanate, for example, and the container to which it is to be flowed, a very small quantity of dry inert gas is fed into the container, thereby raising the vacuum pressure within the polyisocyanate container slightly above that of the rest of the system. This procedure effects the transport of the polyisocyanate out of the container, through stopcocks, and into the reaction mixture chamber. Once the polyisocyanate, for example, is appropriately flowed, a similar procedure may be used with the polyol, for example.

Of course, both of the reaction ingredients, for example polyisocyanate and polyol, can be flowed to the reaction mixture chamber at the same time in this manner in order to save time.

Once the reactant has flowed to the appropriate position, the inlet for the inert gas and the stopcock for the reactant container can be closed. The reactant container again then comes back to the vacuum pressure of the system. Similarly, the reaction mixture, after mixing, can be transported to the mold by bleeding some inert gas into the reaction mixture to thereby slightly raise the vacuum pressure therein above that in the mold and the rest of the system.

It should be recognized that the chemically reactive components start the chemical reaction for forming the polymer, polyurethane for example, when the reactants come into contact. This reaction eventually culminates in the mold when the reaction mixture "sets" or hardens in the resin molds. Vacuum may be maintained over the reactant mixture during hardening. Pot lives of some of the mixtures are as short as about two to fifteen minutes depending upon, among other things, the particular reactants used.

A portion of the reaction mixture normally remains on the walls of the stirrer, the mixing chamber, and the connecting tubes. After a period of time it hardens and self cures on these items of equipment. The hardened pieces or portions of reaction mixture which have become a polyurethane resin body themselves, adhere readily to the equipment but can be easily split from the walls of the equipment when cured if the equipment is of an appropriate substance such as polyethelene, polytetrafluoroethylene, or other antiadhesive material. For that reason, the mixing chamber is set with a mantle of polyethelene, the stirrer is covered with a layer of fluorocarbon polymer, and the connecting tubules from the mixing chamber to the mold chamber are made of polyethelyne. Therefore, after the reaction mixture has cured on any of these items, it can be easily separated off.

For example, the connecting polyethylene tubes are merely pinched between the fingers to release the hardened resin from the inside walls. The resin piece from the inside of the tubes can be reused as filler or in other applications. In many instances, these pieces are crushed or powdered before being used as a filler in another polymer.

The vacuum injection molding equipment may be appropriately fitted with heating and cooling equipment such that the transportation, viscosity, fluidity, pot life, etc. of the reactants and the mixture can be regulated. The molds of a batch process which proceed from the reaction mixture chamber may be arranged either in a series or in parallel from the tube coming from the reaction mixture chamber.

DESCRIPTION OF THE PREFERRED EMBODIMENT

Figure 1:
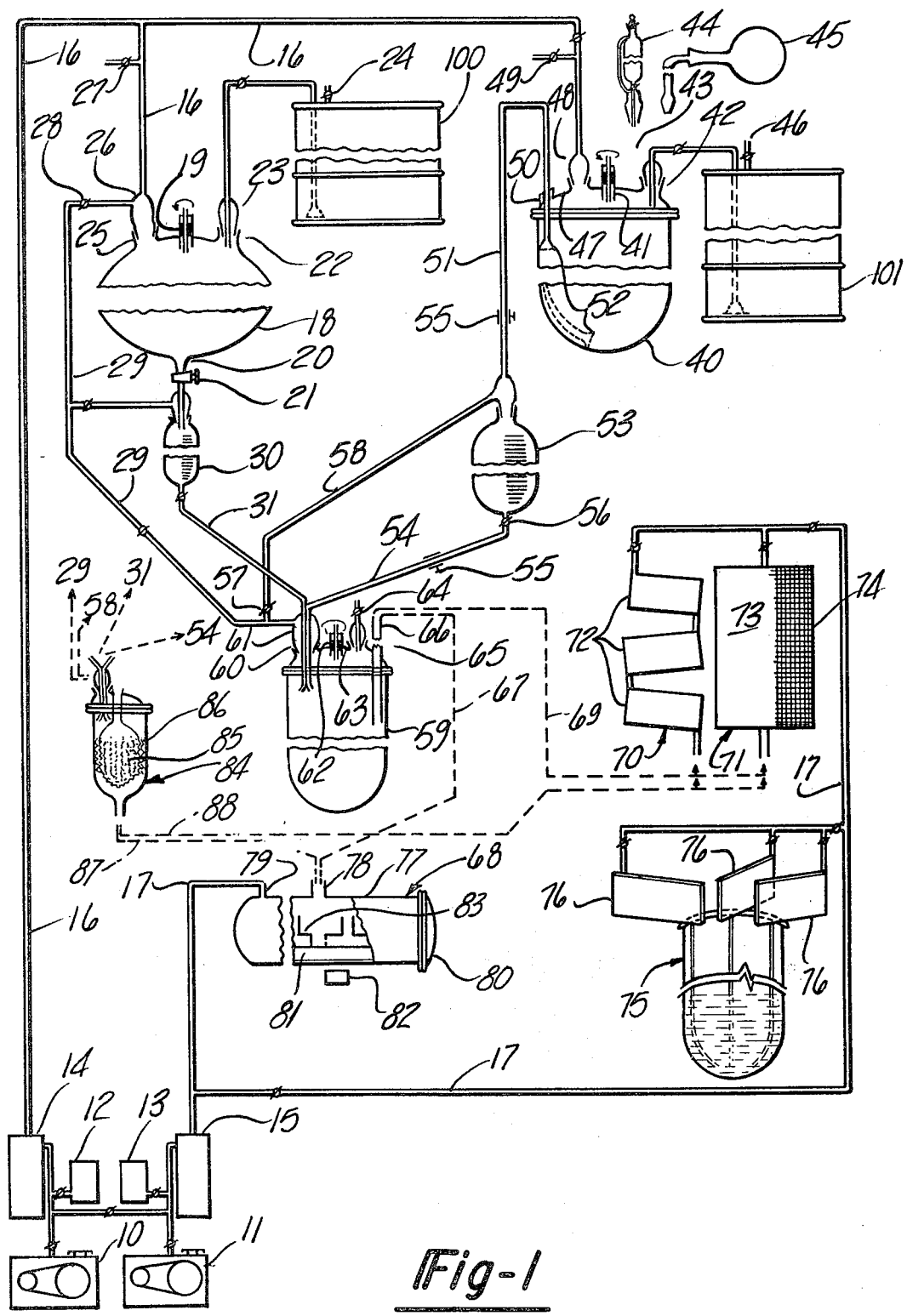
FIG. 1 is a schematic view of the vacuum injection molding system for formation of solid polymer bodies.

FIG. 1 shows a laboratory arrangement for operation of the method of this invention. It should be realized, of course, that the equipment can be scaled up to a manufacturing level, with or without electronic equipment, etc., without departing from the scope or spirit of the invention. The invention will be described for the production of nonfilled, solid, rigid, polyurethane bodies in either a batch or continuous process, but the invention is not limited to polyurethanes or the embodiment below.

Vacuum pump 10, to which are attached in line, McLeod gauge 12 and vacuum trap assembly 14, provides low pressure within line 16. The second vacuum pump 11, to which are attached in line, McLeod Gauge 13 and vacuum trap assembly 15, provides low pressure within line 17. By means of these two vacuum pumps, differential low pressure within the system can be obtained. The vacuum pumps 10 and 11 can be used to speed up the transportation of the liquid materials and for other purposes.

Heating and cooling equipment can be provided at each container or elsewhere in the system in order to change the temperature of the reactants and their mixtures. Heating of the reactant polyisocyanate has the general advantage of assisting degassing thereof, and also has the particular advantage of bringing to completion the reaction of the polyisocyanate and any water present as a contaminant.

A three liter, three ground neck round bottom flask 18 was used as the degassing and demoisturizing kettle. A stirring assembly 19 is provided in order to stir, under vacuum, the reactant, in this case a polyol, in the flask 18. An outlet 20 is provided at the bottom of the kettle 18 and this outlet is connected to the mixing chamber 59 through stopcock 21, graduated separatory funnel 30, and pipe 31. Neck 22 is provided with a vacuum adapter 23 for connecting the flask 18 to the drum 100 containing the raw material, in this case a polyol. The outlet of the drum is provided with a rubber stopper having two holes: one for the connection tube to the kettle 18 and another one 24 for connection to a drying tube (not shown). Raw material is transferred from drum 100 to the kettle 18 by sucking at vacuum pressure.

Neck 22 serves also as an inlet for introducing into the kettle 18 other ingredients to be mixed with the polyol. In the laboratory experiments, the vacuum adapter 23 was taken off and replaced either by a separatory (graduated) vacuum funnel (shown as 44 over the drum 101 with the second raw material) if ingredients are liquid, or by a round bottom flask provided with a flexible, heavy wall tube, joined to a vacuum adapter (shown as 45 over the drum 101) for powdered ingredients. The powdered ingredients, after degassing them under vacuum, are introduced from the flask 45 into the kettle 18 by shaking under vacuum.

Neck 25 is provided with vacuum adapter 26 for connection with vacuum line 16. This adapter is also provided with a side tube and a stopcock 27 for connection, through a drying tube (not shown), to a needle valve stopcock (not shown) appropriately fitted so that dry gas may be fed into the kettle 18, above the level of the polyol, even in very small quantities. The adapter 26 is also provided with another side tube and stopcock 28 for connection to graduated separatory vacuum funnel 30 and also to the mixing chamber 59, through the connecting heavy wall flexible tube 29, disposed outside the kettle 18 and the graduated separatory vacuum funnel 30. These outside connections allow maintenance of equalized reduced pressure in the above-mentioned containers while allowing the liquid to gravity flow. That gravity flow can be speeded up by applying a differential low pressure between the graduated separatory vacuum funnel 30 and the kettle 18, or between the mixing chamber 59 and the graduated separatory vacuum funnel 30 by regulation of the needle valve attached to the stopcock 27 and by closing the appropriate stopcocks.

Graduated separatory vacuum funnel 30 serves as a metering device, by volume, for the polyol with its ingredients. From that funnel, product is let in to the mixing chamber 59.

A resin reaction kettle 40 with a cover having four ground necks was used (1) as the degassing and demoisturizing kettle for the second matter, as well as (2) the mixing chamber for preparing, under vacuum, liquid mixtures with solid particles. A stirring assembly 41 was disposed at the central neck of the container 40.

Neck 42 is provided with a vacuum adapter 43 for connecting the kettle 40 to the drum 101 with the second raw material, in this case polymeric isocyanate. The outlet of the drum is provided with a rubber stopper having two holes, one holding the connecting tube to the kettle 40 and the other holding a tube with stopcock 46 for connection to a drying tube (not shown). The raw material from the drum 101 is transferred into the kettle 40 by vacuum sucking. Neck 42 serves also as the inlet for introducing other ingredients to the kettle 40. In such a case, the vacuum adapter 43 is taken off and replaced either by a container such as a separatory graduated vacuum funnel 44 for liquids or the round bottom flask 45 for powdered solids. Flask 45 is provided with a flexible heavy wall tube, which, through the glass ground joint, connects the flask 45 to the kettle 40 by the neck 42.

Neck 47 is provided with the vacuum adapter 48 for connecting kettle 40 to the vacuum line 16. This vacuum adapter is also provided with side tube and stopcock 49 for connecting kettle 40, through a drying tube (not shown), to a needle valve stopcock appropriately fitted so that dry gas may be fed into kettle 40.

Neck 50 is provided with an elastomeric fit so that a polyethylene (or equivalent) tube 51 can easily slide up and down within the fit so as to dip into the polyisocyanate or its mixture with filler within kettle 40. The end of tube 51, being inside the chamber 40 is provided with sieve filter 52. Kettle 40 is connected to mixing chamber 59 by means of tube 51, separatory vacuum funnel 53 and tube 54. Tubes 51 and 54 have either screw compression clamps 55 as shown or stopcocks with tetrafluoroethylene plugs 56.

The graduated separatory funnel 53 is much larger than funnel 30. This is due to the fact that it may serve as the tank for a liquid mixture with solid particles. From funnel 53, the mixture is transferred to the mixing chamber 59 by gravity flow which can be speeded up by applying a vacuum differential. To get the needed equalized reduced low pressure between the funnel 53 and the chamber 59, flexible tube 58, and the stopcock 57 are used.

A four liter resin reaction flask with a cover of four ground necks was used as the mixing chamber 59. Neck 60 is provided with vacuum adapter 61 with two connecting tubes 31 and 54. This vacuum adapter is also provided with a side tube to provide, if needed, equalized low pressure in both the mixing chamber 59 and the graduated separatory vacuum funnel 30, as well as in the chamber 59 and the funnel 53. Stirring assembly 62 is disposed in the center neck of the cover.

Neck 63 is provided with a vacuum adapter and stopcock 64 for connection, through a drying tube (not shown), to a needle valve stopcock (not shown), appropriately fitted so that dry gas may be fed into the mixing chamber 59 above the level of the mixture, even in very small quantities. This adapter can be taken off and replaced by a separatory, graduated vacuum funnel 44 for liquid ingredients or by a round bottom flask 45 to introduce powdered additives into the mixture during the mixing operation.

Neck 65 is provided with an elastomeric fit so that polyethylene (or equivalent) tube 66 can easily slide up and down within the fit so as to dip into the level of the solid liquid mixture of polyol/polyisocyanate with solid particles.

The polymer product is then flowed by vacuum sucking to any or all of the molds 68, 70, 71, 72, and 75.

The mixture is transferred to the mold 68 either by gravity flow or by vacuum sucking. If the transfer is by gravity flow at equalized vacuum pressure, an outlet must be provided at the bottom of kettle 59 similarly to the outlet at the bottom of flask 18. The outlet is connected through flexible conduit (not shown) to the vacuum adapter (not shown) at the inlet 78 of the mold assembly 68.

If the transfer is by vacuum sucking from the chamber 59 to the mold assembly 68 through flexible conduit 67, a screw compression clamp must be provided.

Alternatively, the mixture is transferred to the mold assemblies 70, 72, and 71 through flexible conduits 69 which may then be provided with a screw compression clamp (not shown). Whether by gravity flow or vacuum sucking, mixture drops down into the mold assembly 68 at vacuum pressure by gravity, whereas it is sucked into the mold assemblies 70 and 71 by vacuum sucking. Mold assembly 68 is composed of a long glass tube 77 with an inlet 78, a vacuum outlet 79 and a cover 80. Inside the tube 77 is metallic band 81 having a round bottom support on which molds 83 are placed as shown in the cutaway portion. Metallic band 81 is moved from outside tube 77 by magnet 82.

Molding assembly 70 is composed of three molds 72 positioned vertically, one above the other. They are joined by means of short tubes and are filled by only one uninterrupted sucking operation (screw compression clamps are not shown).

In molding assembly 71, only one mold is used. One half of the front of mold plate 73 is broken away to show therein wire netting 74 inside the mold (compression clamps not shown).

Molding assembly 75 is composed of a resin kettle like kettle 59 but without a cover and three molds 76 with tubes long enough to reach the bottom of the kettle. The resin kettle containing a certain quantity of the mixture to be sucked is shown in cross section. Filling of all molds is done simultaneously by vacuum sucking (some of the tubes are not shown).

Alternative to the batch process using kettle 59 described above, the polyurethane or other product may be formed by continuously flowing reactants into mixing chamber 84 which is properly connected to lines 29, 31, 54, 58, 87, and 88 as shown in FIG. 1.

A mixing rotator 85 having a knurled surface is positioned in chamber 84. The inside walls 86 of chamber 84 are also knurled so as to be closely adjacent the knurled surface of the rotator 85. When reactants enter at the top of chamber 84, they mix as they pass between the mating knurled surfaces of rotator 85 and walls 86.

Of course, the rotator 85 with its knurled surfaces as well as inside walls 86 together with their knurled surfaces of chamber 84 are covered with antiadhesive material or layers of antiadhesive material.

Any of the various containers and vessels of the system may also be heated if desired and depending upon the reactants or other ingredients used.

Having described my invention, it will become apparent to those skilled in the art to vary the arrangement or type of equipment, the reactants used, and other aspects described above without departing from the scope or spirit of the invention.

Therefore, what I claim is:

1. A process for forming void free solid polyurethane bodies from a first reactant comprising polyol and a second reactant comprising polyisocyanate, said reactants being selected so as to form a solid, rigid polyurethane body, said process comprising the steps of:
    (a) evacuating a vessel of said first reactant and a container of said second reactant to thereby dehumidify and degas said first reactant and said second reactant;

(b) flowing said first reactant and second reactant into a common chamber under vacuum;

(c) mixing said first reactant and said second reactant in said chamber under vacuum;

(d) flowing the mixture of said first reactant and said second reactant into a mold under vacuum; and (e) standing said mixture in said mold under vacuum to thereby form a solid polymeric body.

2. A process according to claim 1 wherein step (d) comprises manipulating the vacuum pressure in at least one of said chamber and said mold so as to flow said mixture into said mold.

3. A process according to claim 1 wherein step (d) comprises:

(i) increasing the pressure somewhat in said chamber by bleeding thereinto a small quantity of dry gas; and (ii) releasing said mixture into said mold under vacuum, whereby said mixture is flowed into said mold due to the increased pressure in said chamber over the vacuum pressure in said mold.

4. A process according to claim 1 wherein the mixing of step (c) is accomplished by a stirrer in said mixture.

5. A process according to claim 1 wherein the vacuum used is from 760 mm Hg to about 0.5 mm Hg.

6. A process according to claim 1 wherein said first reactant and said second reactant are held in said common chamber for evacuation before mixing.

7. A process according to claim 1 further comprising controlling the temperature of at least one of said first reactant, said second reactant, and said mixture.

8. A process according to claim 1 and further comprising the step of adding a filler to said first reactant before mixing.

9. A process according to claim 1 and further comprising the step of adding an additive to said mixture.

10. The invention as defined in claim 1 wherein at least one of steps (b) and (d) are accomplished at least in part by gravity flow.

11. The invention as defined in claim 1 wherein said process is continuous, reactants are continuously added under vacuum and polymeric bodies are continuously removed without exposing any of said mixture to a higher pressure until after curing as a solid polymeric body.

12. The invention as defined in claim 1 and further comprising the step of supplying said first reactant to said vessel from a supply drum by sucking said first reactant therefrom while bleeding dry inert gas into the drum above the level of first reactant.

13. The process according to claim 1 further comprising heating said polyisocyanate under vacuum prior to mixing said polyol and said polyisocyanate in said chamber, thereby bringing to completion the reaction of said polyisocyanate with any water contaminant in said polyisocyanate.

14. The process according to claim 1 and further comprising the step of volumetrically measuring the amounts of said first and second reactants flowed to said chamber.

15. A process according to claim 1 wherein step (b) comprises:

(i) decreasing the vacuum somewhat in said vessel and said container by bleeding thereinto a small quantity of a member selected from the group consisting of dry gas, dry air, and dry inert gas;

(ii) releasing said first reactant and second reactant into said chamber under vacuum, whereby said first reactant and said second reactant are flowed into said chamber due to the decreased vacuum in said vessel and said container over the vacuum pressure in said chamber.

16. A process according to claim 1 wherein step (b) comprises manipulating the vacuum pressure in at least one of said vessel, said container, and said chamber so as to flow said first reactant and said second reactant.

17. The invention as defined in claim 1 wherein step (e) further comprises forming said solid polymeric body bonded to another object positioned in the mold.

18. The invention as defined in claim 17 wherein the object is coated with said polymeric body.

* * * * *